Figure 1:
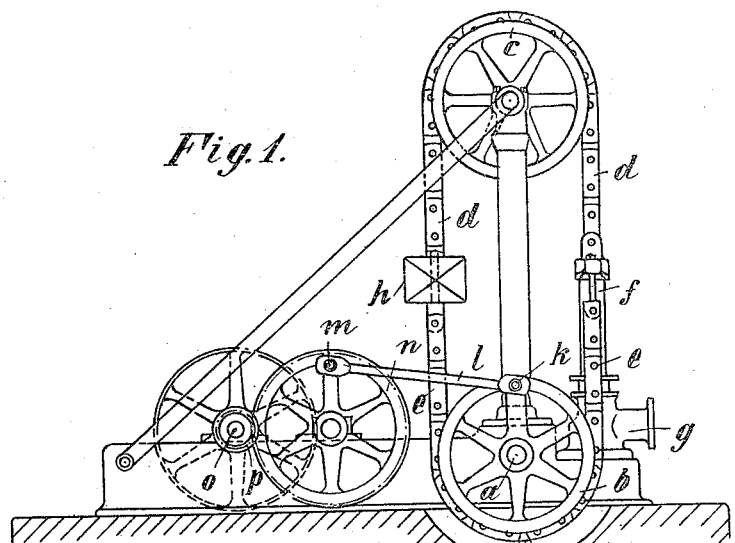
Figure 2:
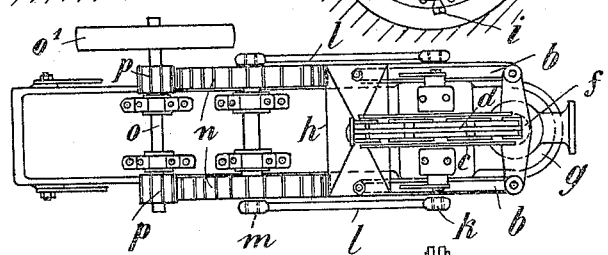

H. W. GERKEN.
GEAR FOR WELL PUMPS.
APPLICATION FILED JAN. 31, 1922.

1,423,102.

Patented July 18, 1922.

Inventor
Heinrich Wilhelm Gerken
By Lawrence Langner
Atty

UNITED STATES PATENT OFFICE.

HEINRICH WILHELM GERKEN, OF WANDSBEK, GERMANY.

GEAR FOR WELL PUMPS.

1,423,102. Specification of Letters Patent. Patented July 18, 1922.

Application filed January 31, 1922. Serial No. 533,114.

*To all whom it may concern:*

Be it known that I, HEINRICH WILHELM GERKEN, a citizen of Germany, residing at Wandsbek, Germany, have invented certain new and useful Improvements in a Gear for Well Pumps, of which the following is a specification.

The present invention refers to a gear for well pumps and particularly for such pumps which are designed for deep wells. In pumps of this description particular difficulty has been met to design a compact gear which requires not too great room of space. It has been proposed, for instance by the German Patent 289358, to use two chains (cables, ropes or the like) of which one is fastened with one end at a comparatively low point to the piston rod of the pump, from there guided over the upper half of an idler and finally fastened with its other end at a low point to a reciprocating driving rod, while the other chain (or the like) is fastened above the said idler at an upper part of the piston rod, guided down round the lower part of the said idler or a second idler, arranged on the same shaft as the first named idler and then fastened above the idlers to the said reciprocating driving rod. This reciprocating rod was driven by a crank connected with a gear wheel or the like, and by its reciprocating movement the piston rod of the pump is reciprocated up and down. Such gear indeed occupies only very small space. However, it has the drawback that the stroke of the piston rod cannot be larger than the double radius of the crank, and therefore there is a limitation with regard to the effect. Moreover, a second drawback is the fact that it is not practical to arrange balance weights for the heavy piston and piston rod, so that the known gear cannot be used for well pumps in wells of considerable depth. For great depth the piston rod as is known is very long and thick, and therefore has an extremely large weight. For this reason it is necessary to arrange balance weights to compensate for the heavy weight of the piston rod so as to reduce the power in operating the pump.

According to the present invention there are also two oppositely guided chains or the like, running over disks or pulleys and adapted to be used as an intermediate member in a gear for vertically reciprocating the piston rod of the pump. However the two disks or pulleys are not fastened to the same shaft as heretofore but are journaled one above the other at a certain distance from each other and the two chains are connected with their ends to one another so as to form an endless chain, running round the two disks or pulleys. On one side the ends of the chains are fastened to the piston rod and on the other side the ends of the chains are fastened to an intermediate balance weight. One of the pulleys is adapted to be set to oscillate and when so operated imparts by the aid of the said chains a vertical reciprocating motion to the piston rod of the pump, the upward stroke being assisted by the aforesaid balance weight.

In the drawing Fig. 1 illustrates the gear in an elevation, and

Fig. 2 in a plan.

Figure 3:
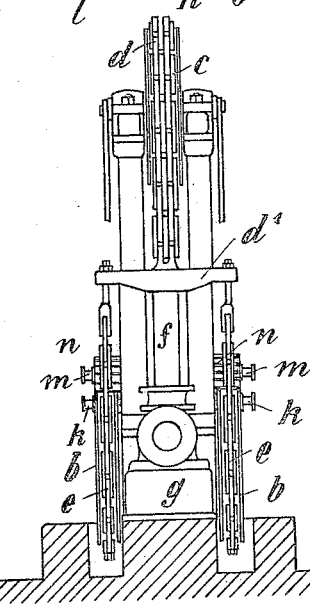

Fig. 3 is an end view of the device.

In the construction shown the shaft $a$ carries two pulleys $b$ around the lower part of which the chains $e$ run, while there is only one upper pulley $c$ around which the chain $d$ is passed. The lower end of that part of the chain $d$, which is above the pump $g$, is fastened to a cross-head $d^1$ of the piston rod $f$, to the ends of which the corresponding upper ends of the chains $e$ are fastened. The duplication of the pulley $b$ and the chain $e$ is here proposed for the sake of symmetry, so as to avoid lateral strains. On the other side of the pulleys the ends of the chains $d$ and $e$ are fastened to the weight $h$. By giving one of the pulleys oscillatory movement the piston rod is raised and lowered. In order to prevent any slipping of the chains on the pulleys, the chains $e$ are fastened to the pulleys $b$ by a bolt or stud $i$ or the like (Fig. 1).

The pulleys $b$ are on their outer faces provided with crank pins $k$, each of which is engaged by a pitman which by its other end engages a crank pin $m$ arranged on a gear wheel $n$. The two gear wheels $n$ are driven by pinions $p$ keyed to a shaft $o$ carrying a belt pulley $o^1$ that can be driven by any suitable source. The radius of the crank pin $m$, that is to say its distance from the centre line of the gear wheel $n$, is somewhat smaller than the radius of the crank pin $k$ and the length of the pitman is equal to the distance between the axes of the pulleys $b$ and the gear wheels $n$. Thus by rotation of the gear wheel $n$ only a reciprocating oscillatory movement of the pulleys $b$ will be obtained, so that the piston rod will be given a reciprocating vertical movement by the intermediate chains.

Preferably the gear is so constructed that the points, where the crank pins $k$ come to rest at the end of each stroke, are lying in a horizontal line with the axis of the gear wheel $n$, thus at each return movement of the crank pin $k$ an equal speed and an equal initial power will be exerted on both points for initiating the return movement.

The length of the stroke of the piston rod is independent from the radius of the crank pin $m$ but rather depends from the outer diameter of the pulleys $b$. However it must be borne in mind that the radius of the crank pin $k$ must always be greater than the radius of the crank pin $m$.

I claim:

1. Gear for well pumps, comprising three pulleys, two being journaled about a common axis and the third pulley being journaled at a distance above the said two pulleys, a sectional chain, one section surrounding the upper pulley and the lower section being doubled and surrounding the said two lower pulleys, a cross head on one side of the endless chain attached at its center to the upper section of the chain and to the upper end of the piston rod of the well pump, and the two ends of the cross head being attached to the ends of the lower double section of the chain on one side, the ends of the chain on the other side being attached to a balance weight adapted to balance the weight of the piston rod, means to reciprocate the endless chain to an extent corresponding to the stroke of the pump.

2. Gear for well pumps, comprising three pulleys, two being journaled about a common axis and the third pulley being journaled at a distance above the said two pulleys, a sectional chain, one section surrounding the upper pulley, and the lower section being doubled and surrounding the said two lower pulleys, a cross head on one side of the chain attached at its center to the upper section of the chain and to the upper end of the piston rod of the well pump, and the two ends of the cross head being attached to the ends of the lower double section of the chain on one side, the ends of the chain on the other side being attached to a balance weight adapted to balance the weight of the piston rod, cranks connected with the lower pulleys, wheels journaled in approximately the same vertical planes as the said pulleys, cranks on the said wheels, the first named cranks having a somewhat larger radius than the second named cranks, pitmans connecting the cranks of the wheels with the cranks of the pulleys, the length of the pitmans being equal to the distance between the axes of rotation of the said cranks and means to rotate the said wheels.

HEINRICH WILHELM GERKEN. [L. S.]

Witnesses:
  E. KASPAREK,
  MAX KAEMPFF.